(12) United States Patent
Wang

(10) Patent No.: US 6,274,266 B1
(45) Date of Patent: Aug. 14, 2001

(54) BATTERY CHAMBER CONTACTS FOR HANDHELD ELECTRONIC DEVICES

(75) Inventor: Ching-Yuan Wang, Taipei (TW)

(73) Assignee: TelePaq Technology Inc., Taipei (TW)

( * ) Notice: Subject to any disclaimer, the term of this patent is extended or adjusted under 35 U.S.C. 154(b) by 0 days.

(21) Appl. No.: 09/369,330

(22) Filed: Aug. 6, 1999

(30) Foreign Application Priority Data

Oct. 21, 1998 (TW) .................................................. 87217357

(51) Int. Cl.[7] .................................................. H01M 2/00
(52) U.S. Cl. ........................ 429/163; 429/179; 429/100; 429/121; 429/97; 320/107
(58) Field of Search ..................................... 429/163, 175, 429/176, 178, 179, 96, 97, 99, 100, 90, 121; 320/112, 107, 114

(56) References Cited

U.S. PATENT DOCUMENTS

| | | | |
|---|---|---|---|
| 5,667,906 | * 9/1997 | Huang | 429/90 |
| 5,928,809 | * 7/1999 | Ju | 429/100 |
| 5,935,729 | * 8/1999 | Mareno et al. | 429/100 |
| 5,958,618 | * 9/1999 | Sullivan | 429/99 |
| 6,004,690 | * 12/1999 | Van Lerberghe | 429/100 |
| 6,014,009 | * 1/2000 | Wierzbicki et al. | 320/107 |
| 6,127,801 | * 10/2000 | Manor | 320/112 |

* cited by examiner

*Primary Examiner*—Gabrielle Brouillette
*Assistant Examiner*—R Alejandro
(74) *Attorney, Agent, or Firm*—Dougherty & Troxell

(57) ABSTRACT

Improved battery chamber contacts for handheld electronic devices include a plurality of longitudinally aligned and differently spaced battery contacts located on a lateral side of an elongated battery packet. The battery packet is housed in an elongated battery chamber in an electronic device. The battery chamber has chamber contacts mating and engageable with the battery contacts. Electronic coupling between the battery packet and the chamber will be established only when all mating contacts between the battery contacts and the chamber contacts are engaged.

17 Claims, 6 Drawing Sheets

BATTERY CHAMBER CONTACTS FOR HANDHELD ELECTRONIC DEVICES

BACKGROUND OF THE INVENTION

1. Field of the Invention

This invention relates to improved battery chamber contacts for handheld electronic devices and particularly to an elongated battery packet housed in an elongated battery chamber and having a plurality of electric contacts longitudinally located on the lateral sides of the battery packet and the battery chamber.

2. Description of the Prior Art

Conventional handheld electronic devices such as handheld PC, Personal Digital Assistant (PDA), cellular phone (also called as mobile phone), household wireless phone, electronic dictionary, electronic game player, pager, walkman audio player, camera (includes digital camera) and electronic calculator mostly have a battery means to provide power supply needed. FIG. 1A shows a typical conventional battery means for a handheld electronic device 1. It includes a holding chamber 2 and a bottom cover 4 to house one or more standard 1.5V non-rechargeable battery 3 therein. The holding chamber 2 is usually located at a lateral side, mostly a bottom side, of the device. The bottom cover 4 has a latch hook engageable with a latch slot located in the holding chamber. Such a fastening structure is not strong and could easily result in break away of the bottom cover 4 from the holding chamber 2, particularly under external force such as accidental dropping of the device. It also gives an impression of low value. It further uses mainly non-rechargeable battery. For those devices which may also use rechargeable battery, a separated battery charging means should be prepared and provided.

FIG. 1B shows another conventional handheld electronic device 7 which uses a non-standard rechargeable battery 8. It usually has a plurality of electric contacts 11, mostly four, transversely located on a surface engageable with equal number of electric contacts 10 located in the device 7. The device 7 further has a plurality of fasteners 9 to hold the battery 8. There are a number of drawbacks for such a structure. The battery 8 mostly has no standard size. Every manufacturer may design whatever it desires. It mostly cannot use standard non-rechargeable batteries. The fasteners 9 should be relatively large size to provide enough strength to hold the battery 8 as the battery 8 is usually heavier and bulkier than a standard non-rechargeable battery. The transversely positioned electric contacts 10 and 11 also make the whole device wide and bulky. If the electric contacts 10 and 11 are arranged longitudinally (in terms of the moving direction of the battery 8), the battery and the device may be made slim and compact. However such a design may cause a new risk. When the battery 8 is incidentally not fully engaged with the device 7 such that the electric contacts 11 mismatches with the electric contacts 10, e.g., the first three contacts of the battery 8 couple with the last three contacts of the device 7, it will generate wrong signals or even causes electric short circuit and damages the device. This is a problem still begging for solution.

SUMMARY OF THE INVENTION

In view of aforesaid disadvantage, it is therefore an object of this invention to provide improved battery chamber contacts for handheld electronic devices that are able to support rechargeable and non-rechargeable batteries, and are longitudinally aligned for avoiding wrong coupling and for shrinking the size of the device.

According to one aspect of this invention, the electronic device includes a device body and an elongated battery packet housed in an elongated battery chamber located in a lateral side of the device body. The battery packet has a plurality of longitudinally aligned and differently spaced battery contacts at one side engageable with same number of longitudinally aligned and differently spaced chamber contacts on a side wall of the battery chamber. Electric coupling between the battery and the chamber will be established only after all contacts are matched and engaged totally between the two. Uncompleted matching or wrong coupling of equally spaced contacts that happens in conventional devices thus may be prevented from happening. Furthermore the battery chamber has an end opening to receive the battery packet and elongated flanges to securely hold the battery packet. The device body may be made compact and smooth and has a high value appearance.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
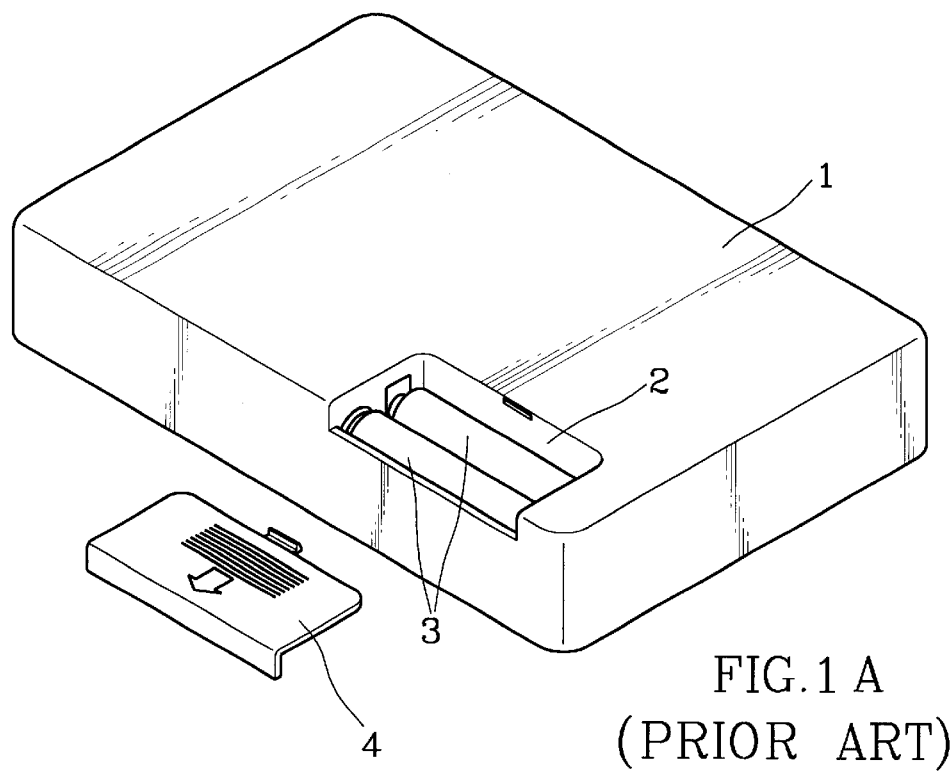
FIGS. 1A and 1B are perspective views of two conventional battery means for handheld electronic devices.
Figure 1:
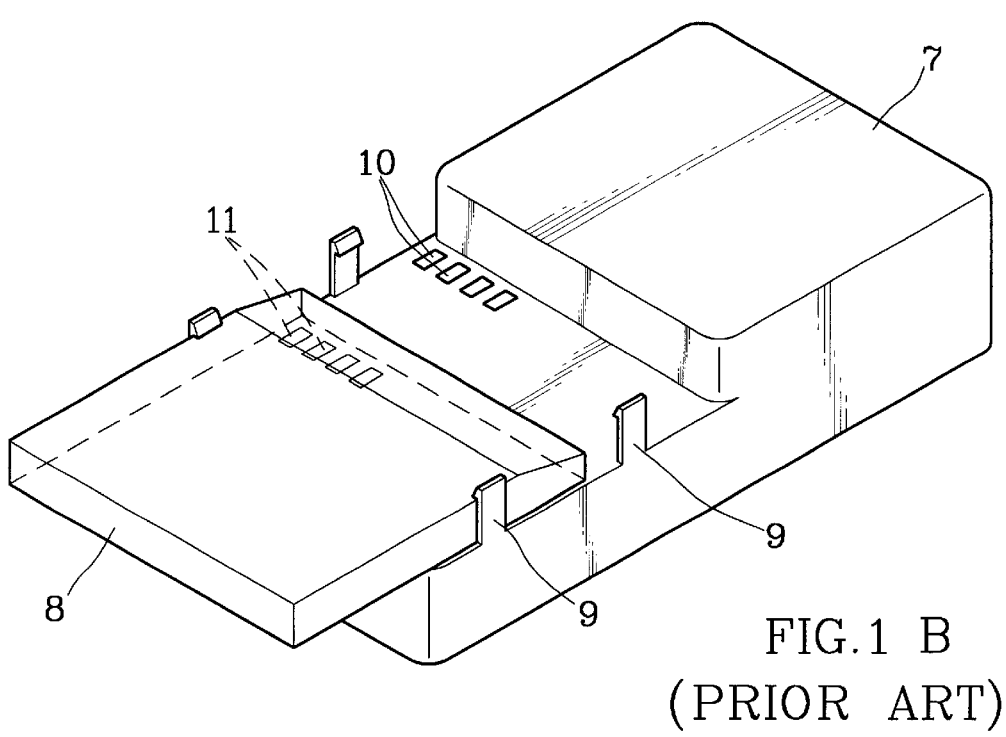
Figure 2:
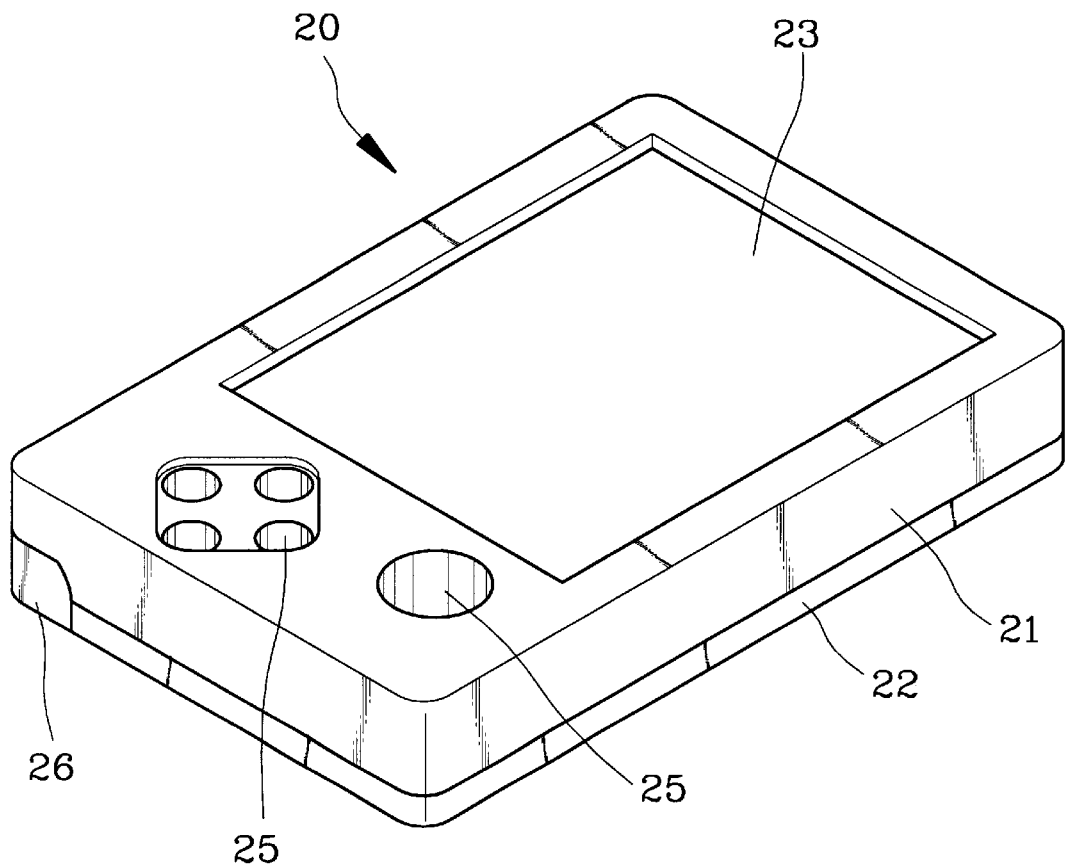
FIG. 2 is a perspective view of an embodiment of this invention, taking a handheld Personal Digital Assistant (PDA) as an example.
Figure 3:
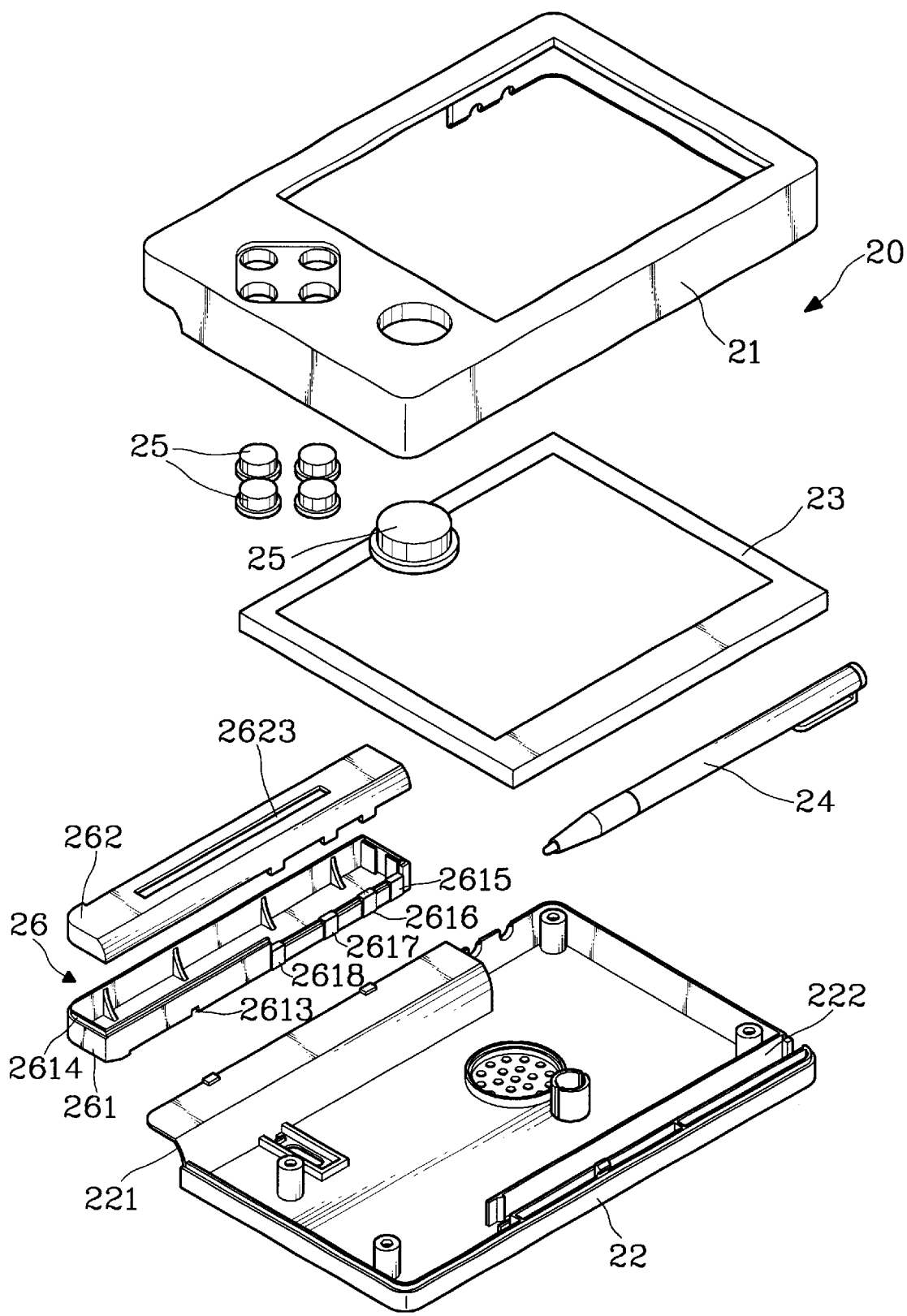
FIG. 3 is an exploded view of the embodiment shown in FIG. 2.
Figure 4:
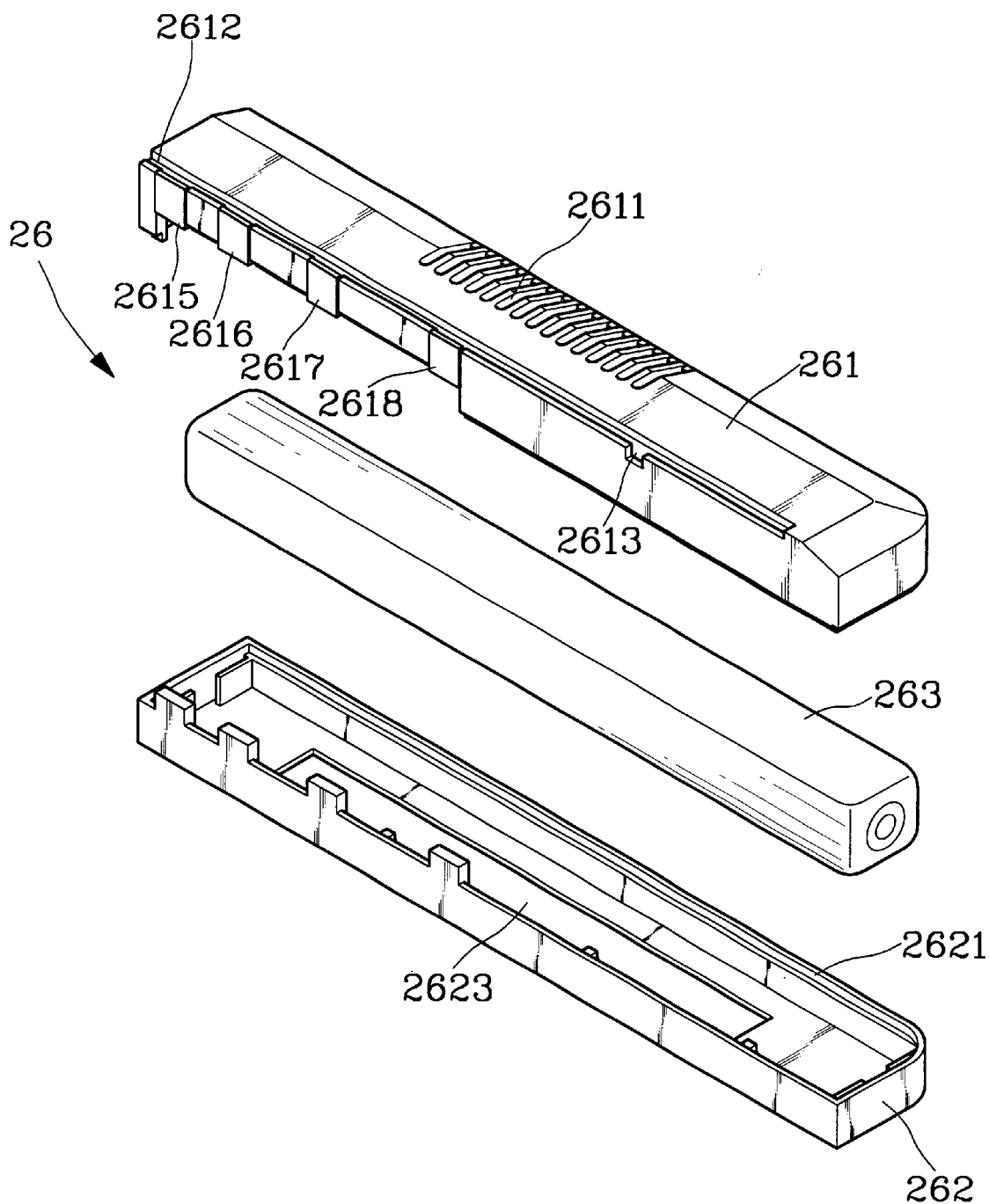
FIG. 4 is an exploded view of a battery packet of this invention.
Figure 5:
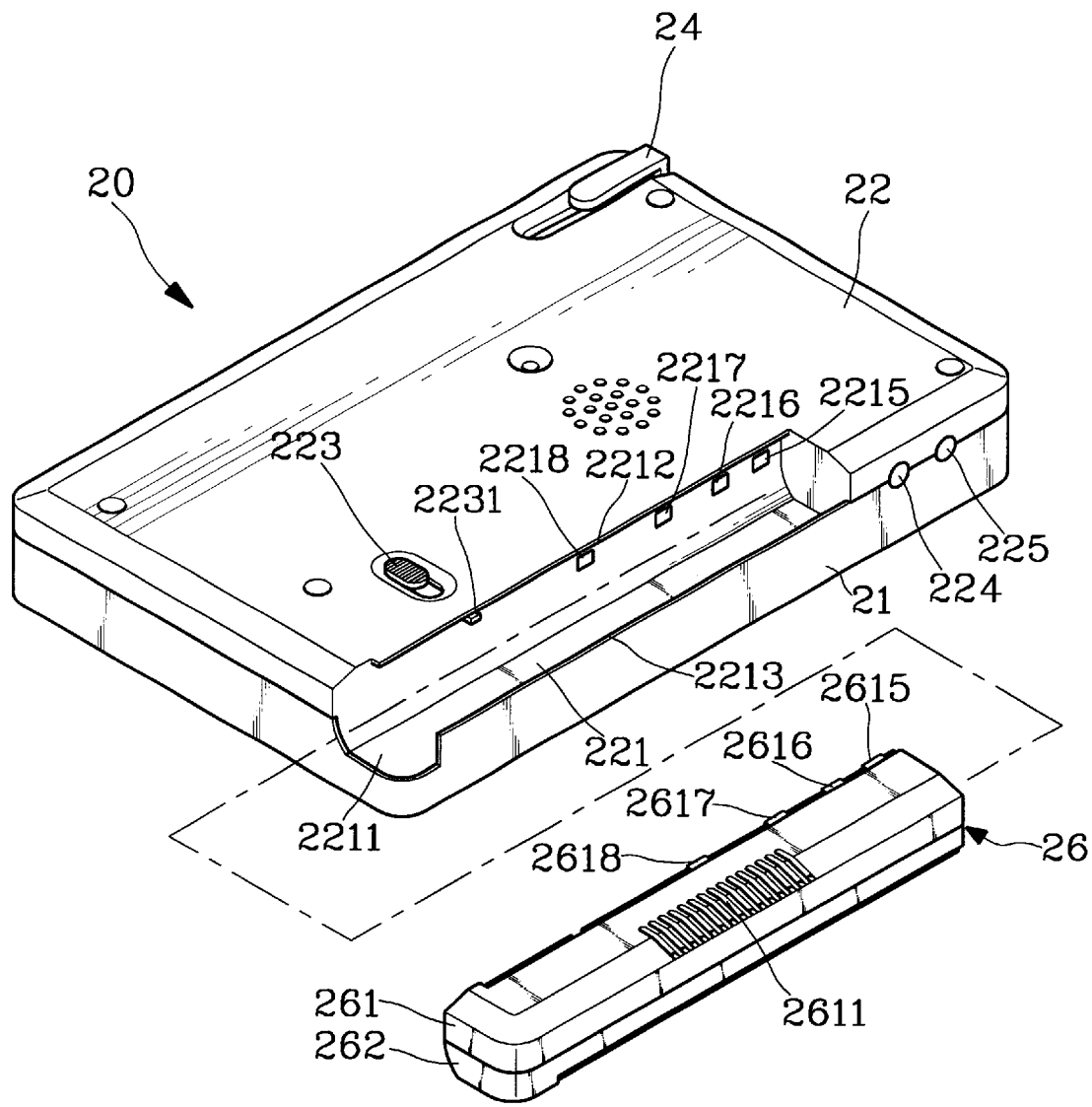
FIG. 5 is a perspective bottom view of the embodiment shown in FIG. 2, with the battery packet disassembled.

Referring to FIGS. 2, 3 and 4, the handheld electronic device 20 (taking a PDA for example) according to this invention includes a device body and a battery packet 26. The device body includes an upper casing 21, a lower casing 22 engageable with the upper casing 21 to form a space thereinbetween for housing a sensor board (or display screen) 23, a stylus 24, a plurality of buttons 25, a control unit (not shown in the figures) and a battery chamber 221. The upper casing 21 has a plurality of openings (unmarked) to enable the buttons 25 and the sensor board 23 to expose outside for user access. The lower casing 22 includes the battery chamber 221 which has an end opening 2211 (shown in FIG. 5) for receiving the battery packet 26 and a stylus trough 222 to house the stylus 24. The stylus 24 may write or input data on the sensor board 23 which transmits signals to the control unit for processing. Referring to FIG. 5, the device body may further has a signal port 224 engageable with a signal cable (not shown in the figure) for transmitting signals to a computer or other devices and a power port 225 for coupling with a DC transformer (not shown in the figure) which in turn connects with an external power supply such as a power socket.

The battery packet 26 includes a lower cover 261 engageable with an upper cover 262 to house a battery unit 263 therebetween. The lower cover 261 has a latch flange 2614 engageable with a latch groove 2621 on the upper cover 262 to ensure close engagement. This engagement may be openable or tight engagement by means of fusion or adhesion. The lower cover 261 may further have gripping traces 2611 formed on an outside surface to enable users to remove the battery packet easily into or out of the battery chamber 221 when desired. The upper cover 262 may also have a slot opening 2623 in a wall thereof. The slot opening 2623 may even be large enough to enable a standard battery to pass through for nesting in the battery packet.

Both the battery packet 26 and the battery chamber 221 are elongate shaped and may be engaged securely through a flange-groove means to make the device body compact and smooth.

In the preferred embodiment shown in FIG. 5, the flange-groove means includes flanges 2212 and 2213 formed at two edges of the battery chamber 221 and groove 2612 formed on a side wall of the lower cover 261. The flanges 2212, 2213 and the groove 2612 extend almost the full length of the battery packet and the battery chamber, hence they provide much stronger fastening force than conventional latch fasteners do.

Moreover the lower casing 22 may provide with a movable latch button 223 which has a latch hook 2231 at one end engageable with a latch notch 2613 located in the lower cover 261 so that the battery packet 26 may be locked in the battery chamber 221 securely without breaking away even under heavy external force.

As the battery packet 26 is an independent member and may be separated from the device body whenever desired, in the event of electrolytic agent leaking due to battery aging or damaging, the packet may be removed and replaced easily. It thus reduces the risk of damaging the electronic device by the highly corrosive electrolytic agent. The replacement of the battery packet is also much cheaper than replacing the whole electronic device.

The battery unit 263 may be a standard non-rechargeable battery or a non-standard rechargeable battery. It thus increases the flexibility and versatility of the device, and making the device more convenient and appealing.

The battery packet 26 has a plurality of battery contacts mating and engageable with same number of chamber contacts located in the battery chamber 221. The battery contacts couple with the battery unit 263 to provide power needed for the electronic device. The contacts mostly include a sensing contact for detecting if the battery unit 263 is a rechargeable one or not, a charge contact to measure the charge level of a rechargeable battery unit and two power contacts for coupling respectively with two poles of the battery unit. When the sensing contact detects the battery unit 263 is a recheagable one, and the electronic device connects with an external DC power supply through the power port 225, recharging of the battery unit 263 will take place automatically. This recharging process will be automatically stopped once the charge contact detects the charge level reaches a high limit which is previously set.

Figure 6:
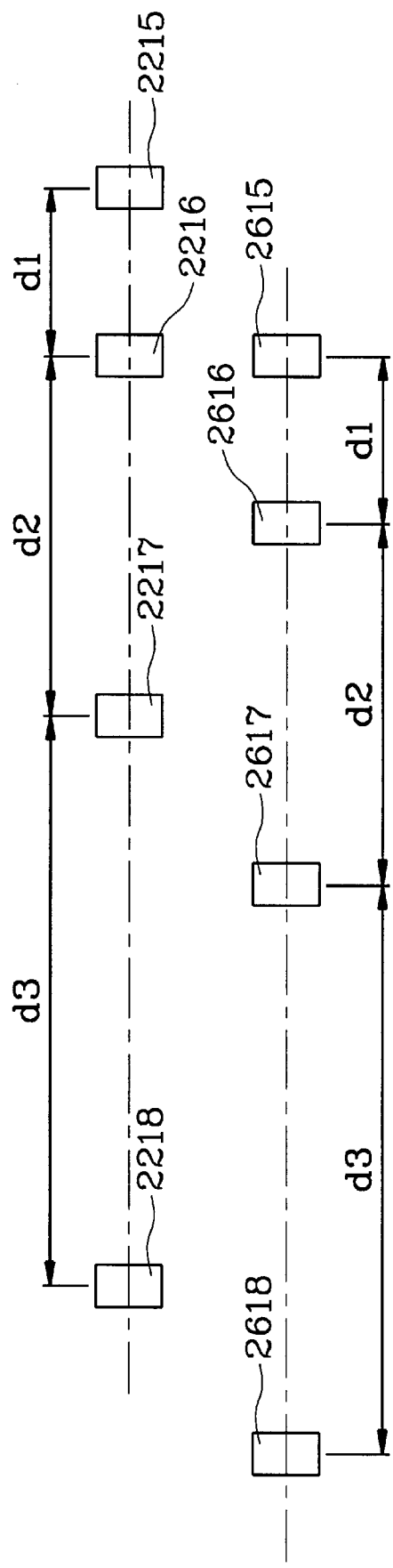
FIG. 6 is a schematic view of battery contacts and chamber contacts of this invention.

In addition to above function and features, this invention further provides the following novel features;

Referring to FIGS. 4 and 6, the electric contacts on the battery packet are longitudinally arranged and are differently spaced with one another. For instance, the first battery contact 2615 is spaced away from the second battery contact 2616 at a distance d1. The second battery contact 2616 is in turn spaced away from the third battery contact 2617 at a distance d2. And the third battery contact 2617 is spaced away from the fourth battery contact 2618 at a distance d3. The distances d1, d2 and d3 have respectively different value. The battery chamber 221 also have four chamber contacts 2215, 2216, 2217 and 2218. They also have intervals of d1, d2 and d3 respectively. Therefore when the battery packet 26 is slipped into the battery chamber 221 through the end opening 2211, the electric coupling between the battery packet 26 and the battery chamber 22 will not be established unless all four pairs of contacts are engaged with one another completely. Partial coupling of two or three pairs of contacts cannot takes place. It thus effectively prevents short circuit or fault signal generation from happening.

The values of d1, d2 and d3 may be set at desirable numbers. It is preferably that $d1 \neq d2 \neq d3 \neq (d1+d2) \neq (d2+d3)$. The value ratio of d1:d2:d3 may be 1:3:5 or 1:2:4 or 1:3:7 or other numbers desired.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiment thereof may occur to those skilled in the art. For instance, the disclosed embodiment has taken a PDA as an example. This invention may be used equally well for handheld PC, Personal Digital Assistant (PDA), cellular phone, household wireless phone, electronic dictionary, electronic game player, pager, walkman audio player, camera (includes digital camera) and electronic calculator. Accordingly, the appended claims are intended to cover all embodiments which do not depart from the spirit and scope of the invention.

What is claimed is:

1. A battery packet for a handheld electronic device comprising:
    a) an elongated housing enclosing a battery unit, the elongated housing including an elongated side;
    b) a plurality of pairs of electrical contacts arranged in a linear array extending in a direction along a length of the elongated side of the housing, the plurality of pairs of electrical contacts being non-uniformly spaced apart from each other such that a distance between each adjacent pair of electrical contacts is different from a distance between each of the other pairs of electrical contacts.

2. The battery packet of claim 1 wherein the elongated housing comprises upper and lower covers attached together.

3. The battery packet of claim 2 wherein the plurality of pairs of electrical contacts are located on the lower cover.

4. The battery packet of claim 1 wherein the plurality of pairs of electrical contacts include four electrical contacts.

5. The battery packet of claim 4 wherein the distance between first and second electrical contacts is d1, the distance between second and third electrical contacts is d2, and the distance between third and fourth electrical contacts is d3, such that $d1 \neq d2 \neq d3 \neq (d1+d2) \neq (d2+d3)$.

6. The battery packet of claim 5 wherein the ratio d1:d2:d3 is 1:3:5.

7. The battery packet of claim 5 wherein the ratio d1:d2:d3 is 1:2:4.

8. The battery packet of claim 5 wherein the ratio d1:d2:d3 is 1:3:7.

9. The battery packet of claim 5 further comprising a plurality of gripping traces located on an exterior of the housing.

10. A handheld electronic device comprising:
    a) a casing having an elongated battery chamber therein, the elongated battery chamber having at least one elongated side wall, an open side and an open end;

b) an elongated battery packet removably located in the elongated battery chamber, the battery packet including at least one elongated side, and housing a battery unit;

c) a plurality of pairs of first electrical contacts arranged in a linear array extending in a direction along a length of the at least one elongated side wall, the plurality of pairs of first electrical contacts being non-uniformly spaced apart from each other such that a distance between each adjacent pair of first electrical contacts is different from a distance between each of the other pairs of first electrical contacts; and, d) a plurality of pairs of second electrical contacts arranged in a linear array extending in a direction along a length of the at least one elongated side of the battery packet, the plurality of pairs of second electrical contacts being non-uniformly spaced apart from each other such that a distance between each adjacent pair of second electrical contacts is different from a distance between each of the other pairs of second electrical contacts, whereby the second electrical contacts are in contact with the first electrical contacts when the battery packet is inserted into the battery chamber.

11. The handheld electronic device of claim 10 wherein each of the plurality of pairs of electrical contacts include four electrical contacts.

12. The handheld electronic device of claim 11 wherein in each of the plurality of pairs of electrical contacts, the distance between first and second electrical contacts is d1, the distance between second and third electrical contacts is d2, and the distance between third and fourth electrical contacts is d3, such that $d1 \neq d2 \neq d3 \neq (d1+d2) \neq (d2+d3)$.

13. The handheld electronic device of claim 12 wherein the ratio d1:d2:d3 is 1:3:5.

14. The handheld electronic device of claim 12 wherein the ratio d1:d2:d3 is 1:2:4.

15. The handheld electronic device of claim 12 wherein the ratio d1:d2:d3 is 1:3:7.

16. The handheld electronic device of claim 12 further comprising a plurality of gripping traces located on an exterior of the battery packet.

17. The handheld electronic device of claim 10 further comprising:

a) a latch device movably located on the casing, the latch device including a latch button and a latch hook; and, b) a latch notch in the elongated battery packet and located so as to be engaged by the latch hook so as to latch the battery packet into the battery chamber.

* * * * *